United States Patent [19]

Chen et al.

[11] 4,379,949
[45] Apr. 12, 1983

[54] METHOD OF AND MEANS FOR VARIABLE-RATE CODING OF LPC PARAMETERS

[75] Inventors: Yeunung Chen, Richardson, Tex.; Michael J. McLaughlin, Hoffman Estates, Ill.

[73] Assignee: Motorola, Inc., Schaumburg, Ill.

[21] Appl. No.: 291,648

[22] Filed: Aug. 10, 1981

[51] Int. Cl.³ .............................................. G10L 1/00
[52] U.S. Cl. ............................................. 179/15.55 R
[58] Field of Search ................ 179/15.55 R, 15.55 T, 179/1 SA, 1 SD; 364/513; 358/260, 261

[56] References Cited

U.S. PATENT DOCUMENTS

| | | | |
|---|---|---|---|
| 3,812,291 | 5/1974 | Brodes et al. | 179/1 SA |
| 3,956,580 | 5/1976 | Murayama | 358/260 |
| 3,976,844 | 8/1976 | Betz | 179/15.55 R |
| 3,992,572 | 11/1976 | Nakagome et al. | 358/260 |
| 4,258,392 | 3/1981 | Yamazaki et al. | 358/260 |

OTHER PUBLICATIONS

Blackman et al., "Variable-to-Fixed Rate Conversion . . .", Proc: IEEE Intern. Conf. on Acoustics, 1977.

*Primary Examiner*—Emanuel S. Kemeny
*Attorney, Agent, or Firm*—Donald B. Southard; James W. Gillman; Edward M. Roney

[57] ABSTRACT

A signal exhibiting redundancy, such as speech subjected to linear predictive coding, is transmitted in a reduced bandwidth by performing a linear interpolation over a number of frames. Interpolated coefficients are tested against quantized values to see if they differ by no more than a threshold. If they do not, only the last frame is sent and intermediate values are reconstructed by interpolation. If the interpolated values differ by more than the threshold from the quantized values, the number of frames for interpolation is reduced and the interpolation is repeated. This is continued until either interpolation is successful or else the next consecutive frame is sent. The required bandwidth for transmission can be varied by varying the threshold, the maximum number of frames for interpolation, the number of LPC coefficients, or a combination of these.

17 Claims, 9 Drawing Figures

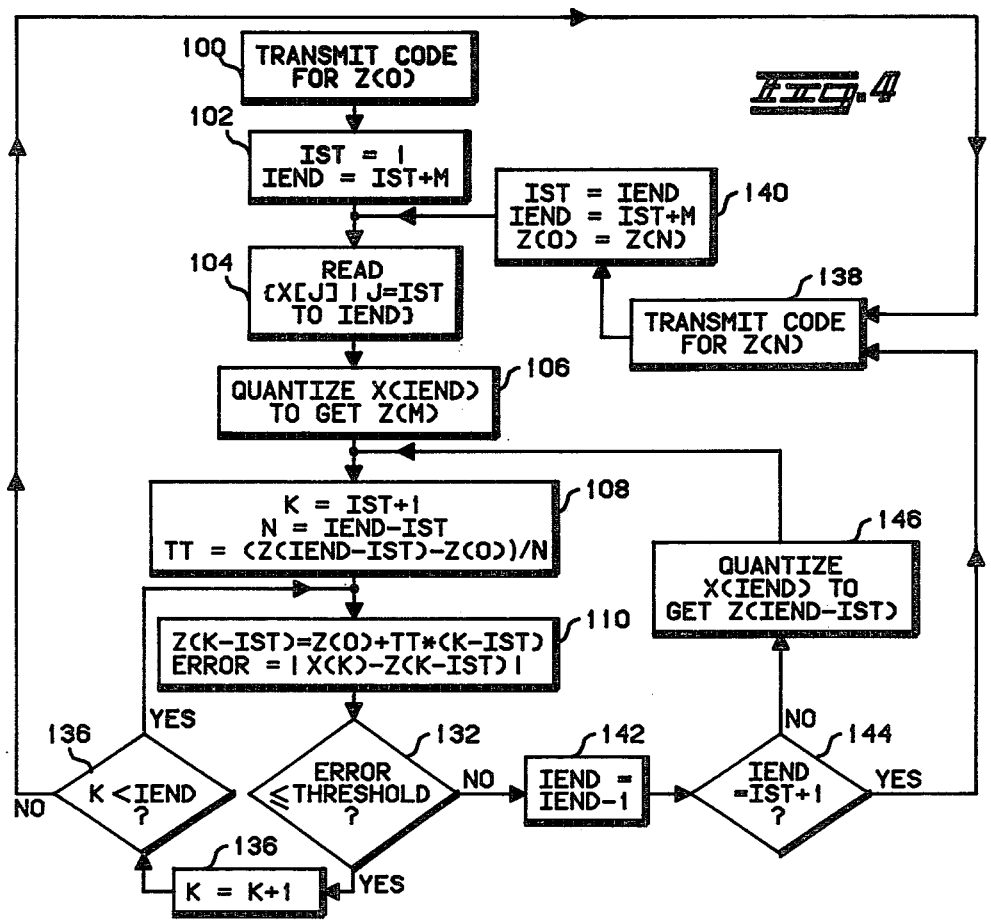
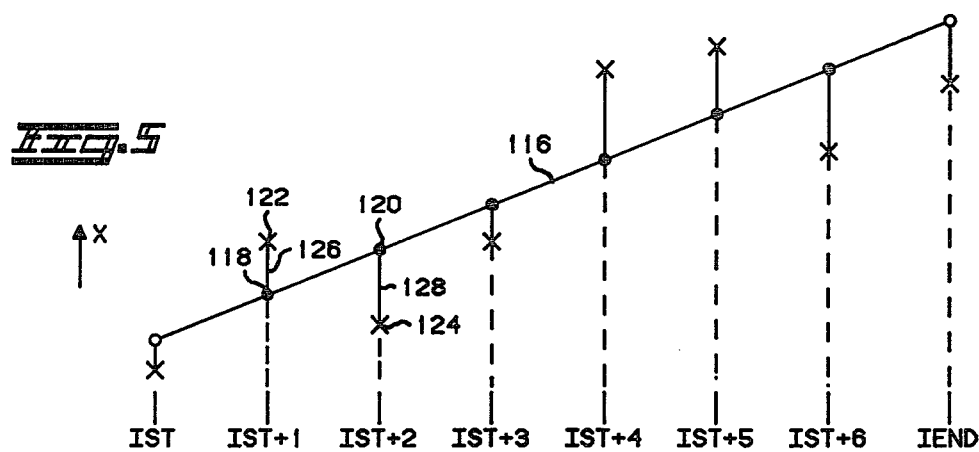

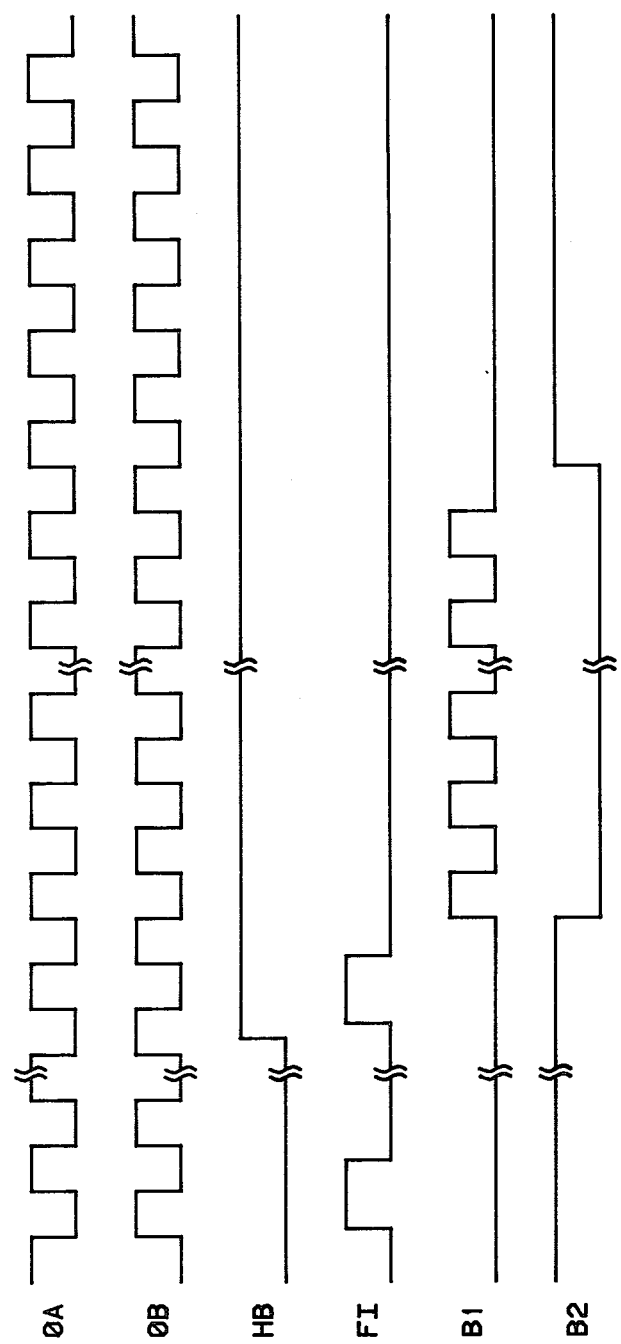

METHOD OF AND MEANS FOR VARIABLE-RATE CODING OF LPC PARAMETERS

BACKGROUND OF THE INVENTION

This invention relates to linear predictive coding. In particular, it is a method and means of reducing the required channel bandwidth by minimizing the amount of information that is sent in transmitting an electrical signal representing speech or any other signal that has been subjected to linear predictive coding.

Linear predictive coding (LPC) is a method of digital coding that is particularly useful for voice signals. It makes use of the fact that in speech the pressure variations that constitute the sound follow patterns that stay the same for relatively long periods of time. LPC is normally applied to make use of four items of information about speech. The first of these is that speech may be either voiced or unvoiced. Voiced signals are signals that begin with a buzz from the vocal cords, while the vocal cords are inactive for unvoiced signals. Either voiced or unvoiced signals are further characterized by three sets of parameters. The first of these is energy or gain which is a measure of the loudness of a speaker. The second is pitch which is the fundamental frequency, if any, that is being generated by the vocal cords of a speaker. The third is some measure of the filtering effect of the vocal tract upon the vibrations generated by the vocal cords or other sound-generating mechanisms. Unvoiced signals are characterized only by energy and vocal-tract parameters; they have no pitch. The vocal tract is typically modeled as a stacked array of cylindrical tubes of varying lengths and diameters that has a series of damped mechanical resonances. The generation of a particular speech sound is carried out, both conceptually and actually, by passing the buzz of the vocal cords or the noise of moving air through the array of resonant structures. When a speaker changes the particular sound that he is making without changing his pitch, he is changing the dimensions of the resonant structures and hence the effect of the vocal tract upon the excitation signal generated by the vocal cords.

It would be possible to characterize the resonances of the vocal tract in a number of ways. These include characterizing the impulse response of the inverse filter, the coefficient values for the LPC direct-form filter, the autocorrelation function of the input speech, filter coefficients for the lattice filter (the so-called reflection coefficients k), the coefficients of the discrete Fourier transform of the autocorrelation function, and various transformations of the reflection coefficients. Speech can then be described in a digital system by developing digital characterizations of the voicing, the energy, the pitch, and of an equivalent filter. Because of the nature of speech, a particular set of filter coefficients will hold essentially the same values for tens or hundreds of milliseconds. This enables the characterization of speech to be made with sufficient fidelity by chopping that speech into frames of the order of 10 to 50 milliseconds in length and ignoring the possibility of any variation in the LPC parameters during that frame. It is also satisfactory in almost all instances to characterize the mechanical resonances by limiting the allowed number of reflection coefficients to ten.

Various transformations of the reflection coefficients have been used to describe the filter equivalent of the vocal tract. One that is of particular value is the logarithmic area ratio, abbreviated LAR which is the logarithm of the ratio of the magnitude of $(1+k)$ to the magnitude of $(1-k)$. A typical frame of speech that has been reduced to linear predictive coding will comprise a header to indicate the start of the frame and a number of binary digits during a period of time of the order of the frame period that signal voiced or unvoiced, energy level, pitch, and ten LARs. While the computation time necessary to determine the pitch and the LARs is of the order of the period of a frame or less, the systems of calculation that are available require information from a number of adjacent frames. For this reason, the information that is being sent to describe an LPC signal normally runs five, ten, or even more frames behind the speaker. Such a time delay is imperceptible to a listener so that the coding is properly described as taking place in real time.

A typical frame of speech that has been encoded in digital form using linear predictive coding will have a specified allocation of binary digits to describe the gain, the pitch and each of ten LARs. Each successive pair of LARs represents the effect upon the signal of adding an additional acoustic resonator to the filter. Limitation of the number of LARs to ten is in recognition of the fact that each additional reflection coefficient becomes progressively less significant than the preceding reflection coefficient and that ten LARs usually represent a satisfactory place to cut off the modeling without serious loss of response. The inclusion of more LARs would provide a marginal improvement in fidelity of response, but the difference between ten LARs and twelve seldom produces a detectable difference in the resulting speech. Furthermore, eight or even fewer LARs are often adequate for understanding. This makes it possible to use a system such as that of the present invention which uses redundancy to reduce the average bit rate and makes a temporary sacrifice of fidelity from time to time when it becomes necessary to reduce the bit rate below the average.

Systems for linear predictive coding that are presently in use have different frame periods and bit allocations. A typical such system is summarized in Table I which is a bit allocation for speech that was treated in frames 12.5 milliseconds in length. This corresponds to 80 frames per second. The voiced-unvoiced decision is encoded as one of the pitch levels so that a separate bit for voicing is not needed.

TABLE I

| Bit Allocation for a Typical LPC System | |
|---|---|
| LPC Parameter | Bits |
| Gain | 5 |
| Pitch | 6 |
| LAR 1 | 6 |
| LAR 2 | 6 |
| LAR 3 | 5 |
| LAR 4 | 5 |
| LAR 5 | 5 |
| LAR 6 | 4 |
| LAR 7 | 4 |
| LAR 8 | 4 |
| LAR 9 | 4 |
| LAR 10 | 4 |
| TOTAL | 58 |

Table I lists a total of 58 bits per frame which, for a frame width of 12.5 milliseconds, would represent a bit rate of 4640 bits per second. The addition of two more bits per frame that is necessary for synchronization raises the bit total to 60 and the bit rate to 4800 bits per second. The use of ten LARs in a frame length of 12.5 milliseconds gives excellent speaker recognition. It is desirable to retain that speaker recognition by retaining the same frame length and the same number of LARs and by keeping the same quantization of the LPC coefficients, all at a reduced bit rate.

One method of reducing the data rate for speech is to use a technique called Variable-Frame-Rate (VFR) coding. This technique has been described by E. Blackman, R. Viswanathan, and J. Makhoul in "Variable-to-Fixed Rate Conversion of Narrowband LPC Speech," published in the Proceedings of the 1977 IEEE International Conference on Acoustics, Speech, and Signal Processing. In VFR coding the first four LARs are examined every frame time. If none of the four LARs has a different quantized value, no information is transmitted for that frame. If any one of the four LARs has a change in quantized value from the last transmitted frame, then all of the parameters are transmitted for that frame. Hence, in this technique, all or none of the LPC coefficients are transmitted at each frame time. Since in some frames no data are transmitted, the resulting data rate is reduced. This has the disadvantage that if one LPC coefficient changes, all are sent, regardless of whether others may not have changed.

It is an object of the present invention to reduce the bandwidth necessary to send digital data.

It is a further object of the present invention to use redundancies of speech to reduce the bandwidth necessary to send a digital characterization of speech.

It is a further object of the present invention to transmit speech subjected to linear predictive coding in an average bandwidth that is less than the maximum bandwidth needed to transmit the encoded speech.

Other objects will become apparent in the course of a detailed description of the invention.

SUMMARY OF THE INVENTION

Digital data, and particularly speech that is encoded digitally by linear predictive coding, are compressed in bandwidth by storing data for each LPC coefficient for a predetermined number of frames. The quantized values of the coefficient for the first frame and that of the predetermined frame are used to determine a straight-line interpolation of the values of the coefficient at intermediate frames. The actual values of the coefficient at each intermediate frame are then compared with the interpolated values. If no value differs from its interpolated value by more than a predetermined threshold amount, only the last value is transmitted. If any value differs from its interpolated value by more than the threshold amount, a new straight-line interpolation is made using the quantized values of the coefficient for the first frame and one frame fewer than the predetermined value. This process is repeated if necessary until either a straight-line interpolation is achieved within the threshold or else the iteration has reached the next successive frame. Whenever data are sent, the entire process is repeated, taking as the first frame the last one sent. Received data are used to reconstruct coefficients according to the linear approximation. It should be evident that, if the threshold is equal to half the step size for quantization, this process introduces no more error than if the coefficients were quantized and transmitted every frame. The bandwidth of the data may be varied by varying the predetermined number of frames, the current number of LPC coefficients, the predetermined threshold, or a combination of these.

BRIEF DESCRIPTION OF THE DRAWINGS

FIG. 3 is a block diagram of a counter circuit that generates timing waveforms for FIG. 2.

FIG. 4 is a flow chart of the operation of the circuit of FIG. 2.

FIG. 5 is a time plot of an interpolation.

FIG. 9 is a timing chart for the circuit of FIG. 7.

DETAILED DESCRIPTION OF THE PREFERRED EMBODIMENT

Figure 1:
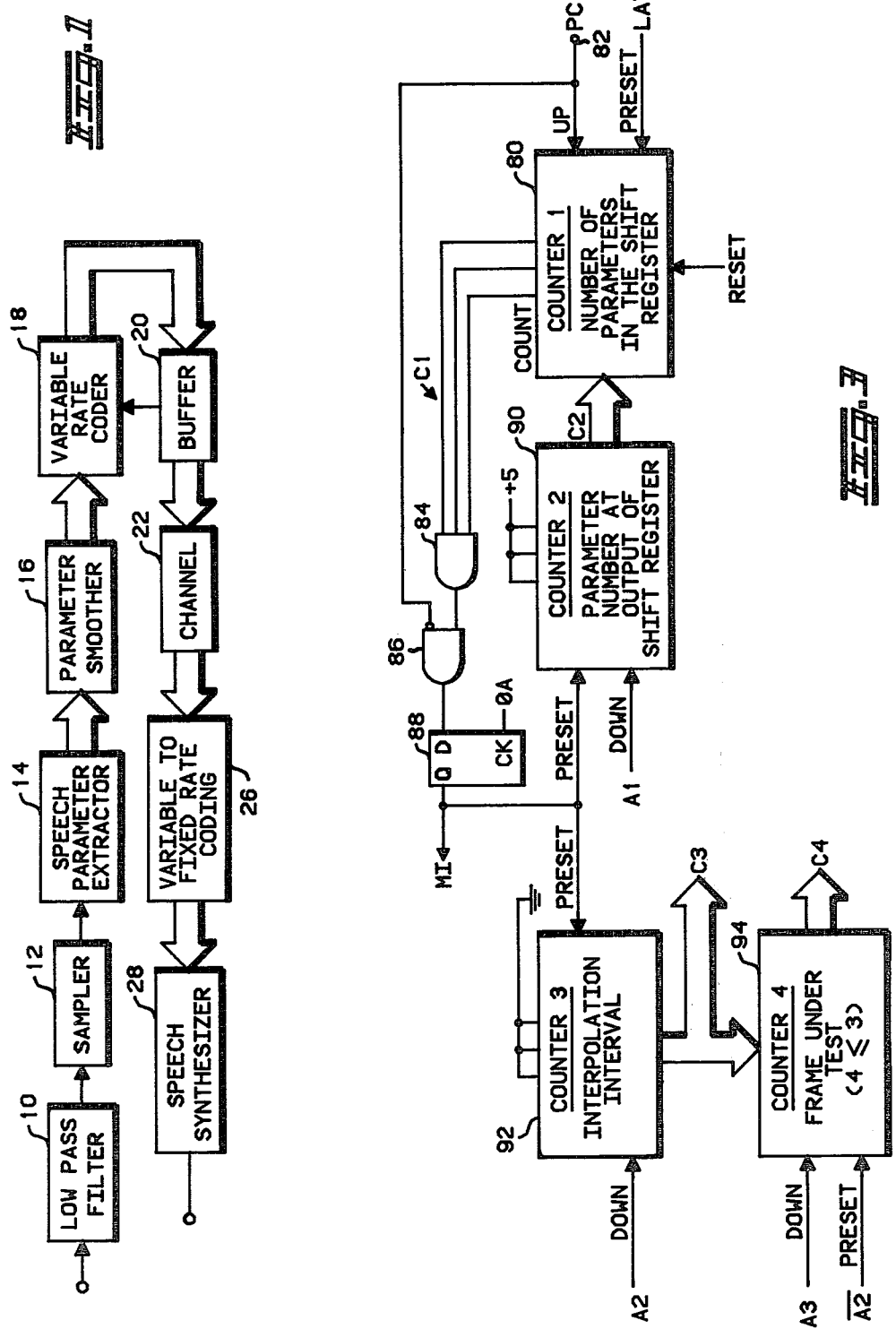
FIG. 1 is an overall block diagram of a circuit for the practice of the present invention.

FIG. 1 is an overall block diagram of a circuit for the practice of the present invention. In FIG. 1 an electrical analog of a waveform of speech or other signal exhibiting redundancy enters low-pass filter 10 which typically has a cut-off frequency of the order of 3 kHz in applications intended for voice radio communication. The filtered signal is applied to sampler 12 which is typically operated at a sampling rate of at least twice the cutoff frequency of low-pass filter 10. This produces as an output of sampler 12 a signal that contains the audio as pulse-amplitude modulation. The output of sampler 12 is applied to speech-parameter extractor 14 which uses any of a number of means, some of which are well known, to extract a set of parameters for linear predictive coding like those of Table I. While the description of the invention that follows will be given in terms of the bit allocation of Table I, it should be understood that different frame lengths, different coding schemes and different bit allocations could be handled equally as well.

The output of speech-parameter extractor 14 is a digital signal comprising synchronization bits, typically two bits, and 58 bits encoding the speech parameters associated with a particular frame. The synchronizing bits identify the beginning and end of an encoded frame. The transmitted frame containing 60 bits representing the synchronization bits and the LPC parameters is taken to parameter smoother 16 and then to variable rate coder 18. The parameter smoother is used to reduce small frame-to-frame variations in parameter values. This processing can be that of a low-pass filter, such as the weighted average of the parameter values over some number of frames, or it can be a median smoother whose output is the parameter value which corresponds to the median of all the parameter values over some number of frames. This smoothing operation, by reducing frame-to-frame variations, decreases the transmitted bandwidth by making a longer interpolation interval more likely.

Variable-rate coder 18 takes the digital data in a fixed frame length and processes that data in a way that will be described to produce frames of lengths that are less than or equal to the frame lengths of the input data. Variably encoded data from variable-rate coder 18 are applied to buffer 20 which restores, if necessary, a data rate that is less per frame than the fixed data rate that is the input to variable-rate coder 18. The digital output of buffer 20 is communicated over a channel 22 by any of a number of means such as modulation of an RF carrier, excitation of a telephone pair, or the like. Buffer 20 is also connected back to variable-rate coder 18 if desired to supply a control signal when a data rate approaches the capacity of channel 22. The control signal may cause variable-rate coder 18 to reduce the number of LARs transmitted. It may cause a change in an interpolating threshold to change sensitivity. It may change the number of frames over which interpolation is being performed. The output of channel 22 is applied to buffer 24 which, like buffer 20, has a storage capability to prevent the loss of data when changes are occurring rapidly. The output of buffer 24 is taken to variable-to-fixed coder 26 which recovers from the variably coded data an LPC signal that is again in the format of the bit allocation of Table I. This signal is applied to speech synthesizer 28 to recover speech which is a close copy of the input speech.

It is an observed feature of human speech that, when samples are taken in frames of the order of milliseconds or tens of milliseconds, there will often be little change in one or more of the LPC coefficients for a number of consecutive frames. This is true by inspection during the pauses between words and syllables, and it is nearly as obvious upon consideration of the number of times in speech that a particular sound is held for significant fractions of a second. The redundancy that is thus created provides a theoretical basis for the operation of the variable-rate coder 18 of FIG. 1. A common practice in LPC speech systems is to have a synthesizer change parameter values at a rate greater than only once per frame when a new value is received. The coefficient values are generally changed between one and four times a frame by forming a linear interpolation of the present frame value and the next frame value. This interpolated value is then used for part of the time of one frame before the next interpolated value is used. One reason for doing this is to prevent unduly rapid changes in coefficient values at frame boundaries. The present invention makes use of an interpolation process to reduce the amount of data that must be transmitted by extending the interpolation process over several frames.

In the present invention, it is necessary to transmit information describing over how many frames a parameter is to be interpolated as well as describing the parameter itself. One method is to send a number indicating which parameter is being sent, a number indicating how many frames have elapsed since the last time the parameter was transmitted and finally the value of the parameter. Another method would send a twelve-bit header every frame time which would indicated which of the twelve parameters (pitch, gain, and ten LARs) are transmitted this frame and then the values for these transmitted parameters. This method requires a twelve-bit header every frame. One method of reducing this overhead is to employ a hybrid technique which uses the present invention for the more significant parameters such as pitch, gain, and the first five LARs, and uses VFR for the less significant parameters, such as the last five LARs. This hybrid technique has been found to work satisfactorily and reduces the header requirements in this case from 12 to 8 bits per frame.

In the operation of the circuit of FIG. 1, the coefficient value for the frame last transmitted and the coefficient values for the next seven frames are considered together. If only this seventh frame is transmitted, s frames of data for that coefficient are not transmitte and the synthesizer uses coefficient values for the frames based on a linear interpolation of the quantize value for the last transmitted frame and the quantize value for the seventh frame. The differences betwee the true values and the interpolated value at each c those frames is error. If the error at each of these frame does not exceed a threshold, then the interpolation prc cess is satisfactory and only the coefficient value corre sponding to the seventh frame is sent. If the error at on of the intermediate frames exceeds the threshold, th linear interpolation is unsatisfactory. The process i then repeated by considering the transmission of th sixth frame and interpolating only over the intermediat five frames. This process is continued until the interpo lation process does not introduce an error exceeding the threshold or until the process reaches frame 1, the frame adjacent to the last previously transmitted frame, in which case frame 1 is transmitted.

Because the exact coefficient value is not transmitted but only a code corresponding to a quantized value, some error is introduced even if a coefficient is transmitted. If the threshold value is chosen to be equal to the maximum quantization error, it is evident that this process of transmitting the coefficient introduces no more error than if the coefficient were coded and transmitted at every frame. In addition, this threshold can be made to vary to afford greater economies of transmission. One particular method which is part of this invention is to use a threshold value at every frame which depends upon the signal energy or upon the LPC gain term. It is known that vowel sounds are more significant to the perception of speech than are the unvoiced sounds. For this reason, the technique of gain suppression is employed which uses a smaller threshold value for frames that have high gain terms and larger thresholds for lower-gain frames. This threshold expansion for unvoiced sounds and particularly for silence allows for greater reduction of transmission.

A further refinement allows the threshold to vary with channel bandwidth. If the channel bandwidth becomes less than the average data rate from the variable-rate coder 18, the threshold values can be enlarged to cause a reduction in the amount of data transmission while allowing a gradual reduction in speech quality. This feature allows additional flexibility for systems where the channel bandwidth varies or the speech information from the LPC parameter extractor may vary, as might be the case between different speakers or with different languages.

Figure 2:
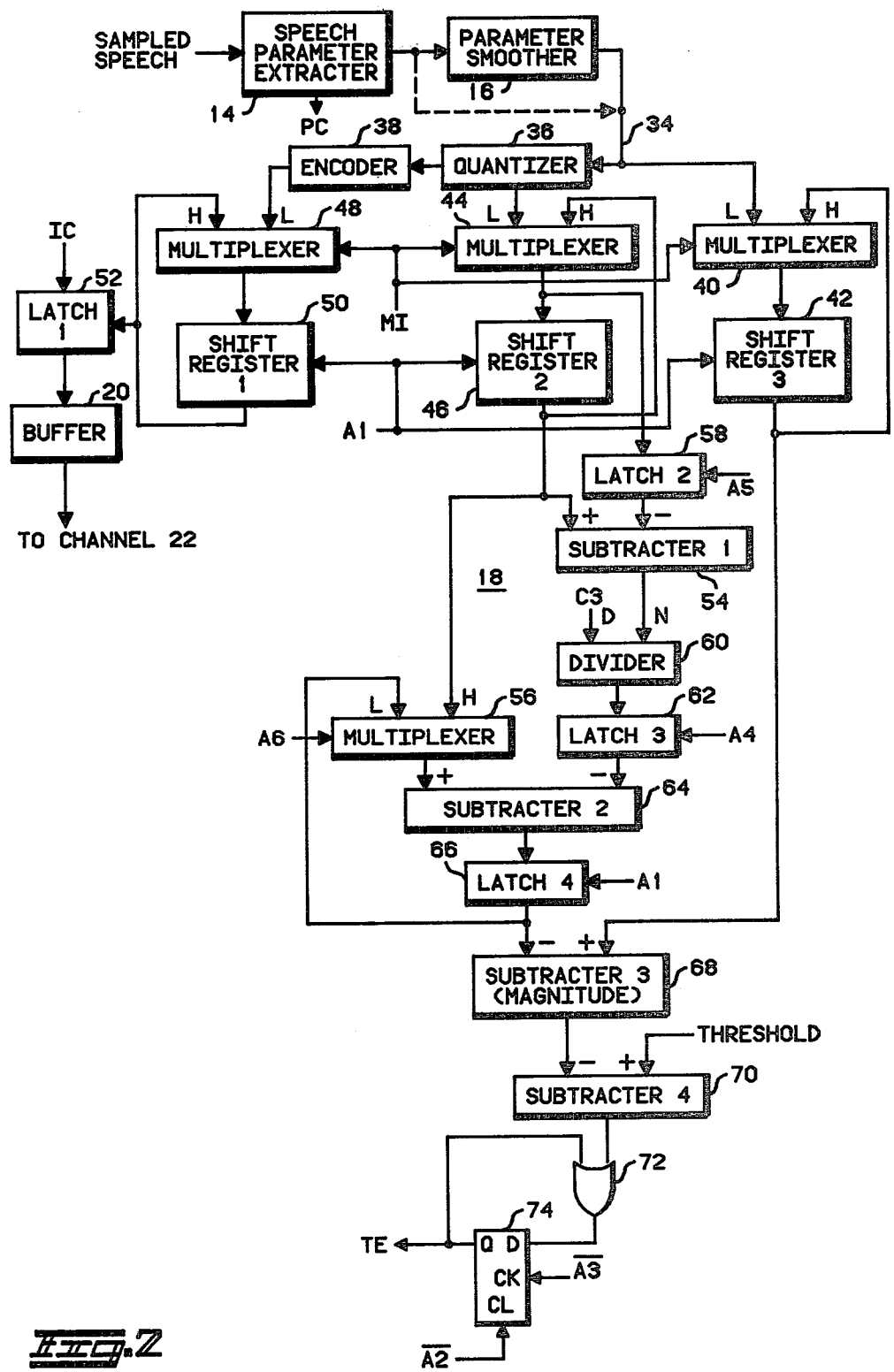
FIG. 2 is a block diagram of a portion of the variable-rate coding circuit of FIG. 1.

FIG. 2 is a block diagram of a circuit realization of the variable-rate coder 18 of FIG. 1. FIG. 2 also includes speech-parameter extractor 14 and parameter smoother 16 of FIG. 1. In FIG. 2, sampled speech from sampler 12 of FIG. 1 enters speech-parameter extractor 14 which extracts LPC parameters and, if desired, smooths them. The smoothing operation of parameter smoother 16 is optional. The circuit of FIG. 2 would apply variable rate coding to just one of the LPC coefficients of Table I. To handle all twelve, it would be necessary either to have a parallel arrangement of twelve of the circuits of FIG. 2, one for each coefficient, or else it would be necessary to increase the number of shift registers to provide one of each of the shift registers for each LPC coefficient. Since the functions would be performed identically for each coefficient, the circuit of FIG. 2 will be described as it operates on one such coefficient which we choose here arbitrarily to be the pitch. The actual value of the pitch is taken either from speech-parameter extractor 14 or parameter smoother 16 on line 34. It is quantized in quantizer 36 and is encoded in binary form in encoder 38. The unquantized value on line 34 is taken as an input to multiplexer 40. The output of multiplexer 40 is taken as an input to shift register 42. The output of shift register 42 is cycled back through multiplexer 40 and into shift register 42 under the control of input MI. Shift register 42 is designed to handle a predetermined number of data elements of the pitch. We choose that number to be eight. The significance of that choice will become apparent later. Referring to Table I, pitch was there given a total of six bits. Thus, under the conditions just described, the actual digital value of the pitch will be represented in shift register 42 while the quantized value is stored in shift register 46.

The output of shift register 46 is taken back as an input to multiplexer 44 and is also taken as an input to subtractor 54 and multiplexer 56. The output of multiplexer 44 is also taken to latch 58, the output of which is applied to subtracter 54. The output of subtracter 54, representing the difference between the output of shift register 46 and the output of latch 58, is taken as an input to divider 60 which, in turn, feeds latch 62. The outputs of multiplexer 56 and latch 62 are subtracted in subtracter 64, the output of which is taken to latch 66. The output of latch 66 is taken back as an input to multiplexer 56 and is also applied to subtracter 68 where it is subtracted from the output of shift register 42. The output of subtracter 68 is compared in subtracter 70 with a threshold signal which is applied through OR gate 72 to D flip-flop 74.

The operation of the circuit of FIG. 2 will now be explained by referring to the counter array, FIG. 3, the flow chart, FIG. 4, the time plot of an interpolation FIG. 5, and the timing chart, FIG. 6 FIGS. 3, 4 and 5 indicate the source for various control and operating signals in FIG. 2. In FIG. 3, a counter 80 receives on terminal 82 a signal PC which is generated by speech-parameter extractor 14 of FIG. 1. The signal PC is generated as a positive pulse each time the particular LPC parameter in question is generated. Thus, it serves as a frame counter, and counter 80 contains the number of different parameters currently in the shift register. Counter 80 is connected to AND gate 84 to produce an output pulse that is taken to AND gate 86 when counter 1 is full. AND gate 86 also receives as an input the negation of PC to generate an output when counter 1 is full and PC goes low. The output of AND gate 86 is taken as an input to D flip-flop 88 which is clocked by a master clock pulse to produce timing signal MI. This is a pulse indicating that the shift register is full and that the process of interpolation should start.

The output MI of D flip-flop 88 is taken as a preset signal to counters 90 and 92. Counter 90 counts down to an A1 input signal which also shifts the parameter shift register so that its output is the proper parameter for interpolation. Counter 92 counts down on a timing signal A2 to hold the number of frames over which the parameter is to be interpolated. That number, C3, is taken as an input to counter 94 which is preset by an inverse of timing signal A2 and is caused to count down by timing signal A3. Counter 94 holds a number that is always less than or equal to the count C3 of counter 92. The count of counter 94 is the number of the frame that is being tested to see whether interpolation is allowed.

FIG. 4 is a flowchart showing the operation of the interpolation discriminator of FIG. 2. The flowchart of FIG. 4 carries out the process of interpolation that has been described. We again describe operation in terms of an interpolation over eight frames, although the number eight is a matter of design choice, and we suppose that the particular LPC coefficient being interpolated is the gain. On startup, operation box 100 transmits the code for the first gain coefficient. In operation box 102 the number of the first frame in the interpolation range or interval is set equal to one and the last frame in the interpolation range is M frames later, where M is typically seven. In operations box 104, the values of the gain for these eight frames are read in as X(J). These are the values stored in shift register 42 of FIG. 2. In operations box 106, the coefficient value for the last frame in the interpolation range is quantized and stored in Z(M). The quantized values for the eight frames are stored in shift register 46 of FIG. 2. In operations box 108, K is initialized to the second frame in the interpolation range, frame IST+1. N is set equal to the length of the interpolation interval, initially seven, and TT is the interpolation step size. The interpolation step size is the difference between the quantized values of the gain at the frames at the ends of the interpolation range divided by the number of frames in the interpolation range. The value of TT is held in latch 64 of FIG. 2. The interpolated value for the second frame in the interpolation range is computed and the difference between the interpolated value and the true value is found in operations box 110, which is the output of subtracter 68 of FIG. 2. This can be seen more clearly by referring to FIG. 5, which is a time plot of eight consecutive assumed values of a coefficient and interpolation over all eight. In FIG. 5, discrete times are given frame numbers ranging from first frame IST to last frame IEND. The endpoints of line 116 are the quantized values of X at frames IST and IEND. Line 116 is a linear interpolation of the values of coefficient X between frames IST and IEND. With values of K counted to the left from IST toward IEND, the equation of line 116 is given by $$Z(K-IST)=Z(0)+TT*(K-IST)$$

where the points on the interpolation line 116 are X(K−IST) at frame K. Thus, referring to FIG. 5, point 118 is obtained by substituting the value of IST+1 for K in the expression for Z(K−IST). Point 120 is obtained by subtituting $K=IST+2$ and the other points follow.

Point 122 is the value actually obtained for the coefficient when $K=IST+1$. Point 124 is the value actually obtained for the coefficient when $K=IST+2$. The error between the interpolated value of point 118 and the actual value of point 122 is the length of line 126, which is given by the expression $$X(K)-Z(K-IST)$$

when $K=IST+1$. Line 128 is the error when $K=IST+2$. Referring again to FIG. 4, operations box 110 calculates the first error, and decision box 132 tests whether that error is less than or equal to some threshold. Assume first that the error is less than the threshold. Operations box 134 then increases the value of K by one. Output is to decision box 136 which tests to see whether the interpolation process has reached as far as the last frame. If it has not, exit is by the "yes" line to re-enter operations box 110 with the new value of K. By this loop, all of the coefficients for frames between IST+1 and IEND−1 are tested to see of the error is less than or equal to the threshold. This process continues until decision box 136 indicates that the process has reached the last frame, at which point exit is from decision box 136 on the "no" line. This causes operations box 138 to transmit the code for the coefficient value for the last frame. Operations box 140 then updates so that the new first frame is the former last frame, and the new last frame is M frames later. In the circuit of FIG. 2, the code is held in latch 52 and counter 80 is preset to begin counting incoming frames until the next interpolation.

Suppose now that the error had exceeded the threshold at some point in the iteration of the loop represented by operation box 110, decision box 132, operations box 134 and decisions box 136. Exit is then to operations box 142. When the threshold is exceeded in an interpolation interval, the output of flip-flop 74 of FIG. 2 goes high. Since the threshold is exceeded, the attempted interpolation range was too great, and it will be necessary to try interpolation over the next smaller range. This is accomplished by reducing by one the number of the last frame in operations box 142. Decision box 144 then tests to see whether the number of the last frame is adjacent to the number of the first frame. If it is, interpolation is not possible and exit to operations box 138 directs transmission of the code for the coefficient of the current last frame. If reducing the number of the last frame by one does not place it adjacent to the first frame, then exit from decision box 144 is to operations box 146, which causes quantization of the value of the coefficient for the current last frame. This is taken as an input to operations box 108, which starts the interpolation process again over a number of frames that is one smaller than the last preceding interpolation.

The flowchart of FIG. 4 is a functional representation of the interpolatioon process of the circuit of FIG. 2, as plotted in FIG. 5. It is also an operating flowchart that can be used to construct a computer program for the realization of the interpretation process. Such a computer program is included here as Appendix A.

Figure 6:
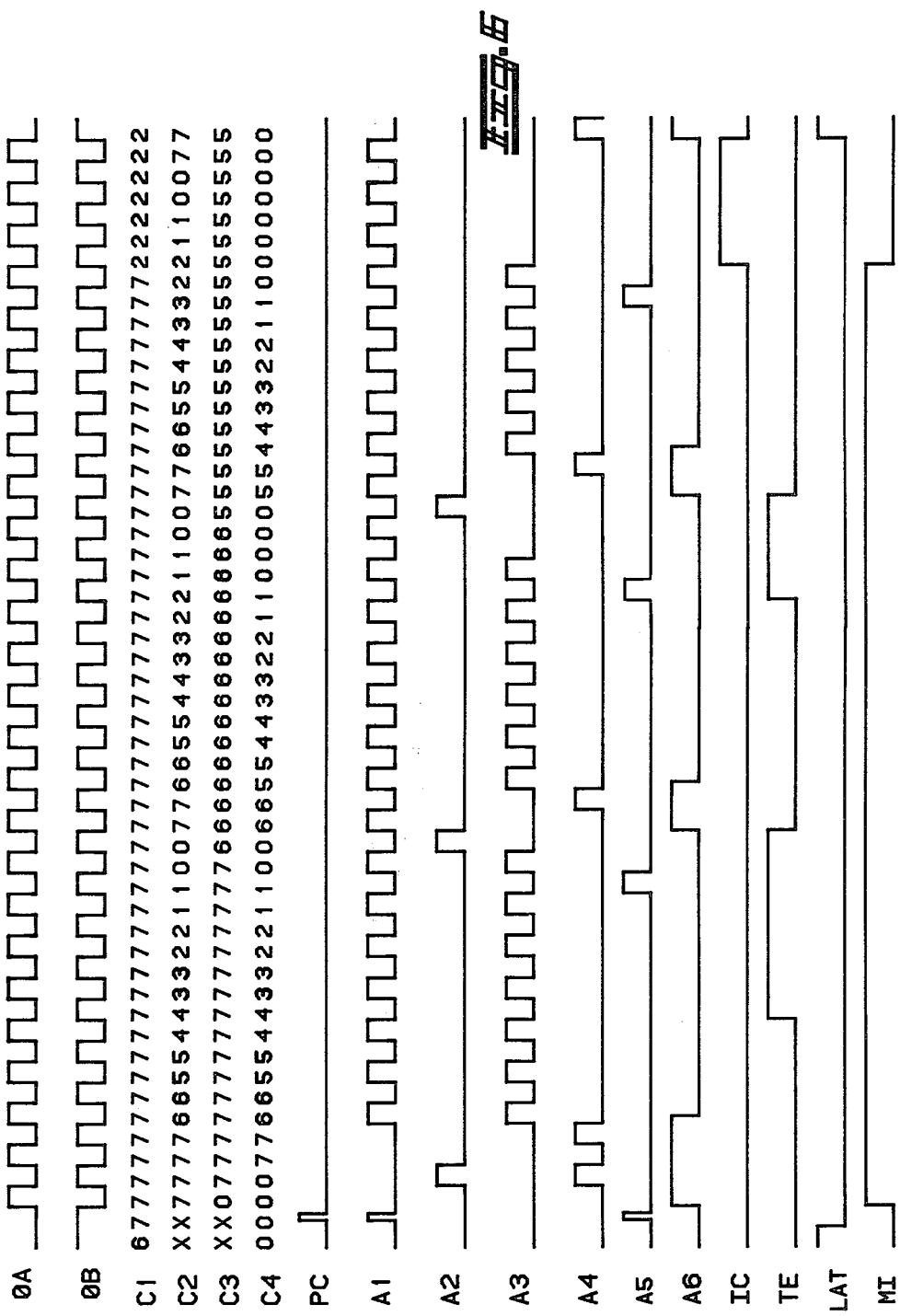
FIG. 6 is a timing chart for FIG. 2.

FIG. 6 is a timing chart for the circuits of FIGS. 2 and 3. FIG. 6 also includes the counters C1, C2, C3 and C4 on counters 1–4 respectively under the assumption that at this particular time interpolation over eight frames and over seven frames is not effective, but interpolation over six frames is effective. The various time waveforms and numbered elements of FIG. 6 are summarized in Table 2. Refer in FIG. 6 to line C1. This is a count of the number of parameters currently in shift registers 50, 46 and 42 of FIG. 2. When the number in counter 1 is less than seven, the shift registers are still filling and there is no information to be transmitted. This is true in the first time interval as evidenced by the fact that counter 1 lists six parameters in the registers for the first frame. Counters 2 and 3 are then in a don't-care state, denoted "x", and counter 4 has remained at zero from the last preceding interpolation. Action starts in the second time increment when counter 1 first counts to seven, indicating that the shift registers have data for the seven frames following the last transmitted frame as well as the data for the last transmitted frame. The full register coincides approximately with the end of a cycle of parameter calculation, and the end of that cycle is indicated by a pulse PC. This starts the interpolation process which continues during all of the time intervals when counter 1 is at seven. Counter 2 reflects the fact that all eight numbers in the shift register are read out for interpolation while they are simultaneously cycled back into the register. This occurs while counter 3 holds a count of seven. During this time counter 4 indicates that the interpolation process is testing each frame successively to see if the threshold is exceeded. Referring to waveform TE, it is evident that the threshold was exceeded in frame 4. This means that interpolation over eight frames is not satisfactory. Counter 3 is then incremented by waveform A2 to count down one number. Counter 4 now indicates that the outputs of frames 6 through zero are read out for interpolation. Waveform TE again indicates that the threshold was exceeded, this time at frame 1. The process is now repeated with counter 3 indicating interpolation over five frames. Since waveform TE has not gone high before counter 4 counts to zero, interpolation over five frames was successful. Waveform IC causes latch 1 to hold the value of frame 2 from counter 2 and, if desired, the interpolation interval of five from counter 3. This will be used together with the last value previously sent to interpolate and reconstruct data. Counter 1 is now set to two which is the number of parameters left in the shift register that need to be transmitted, and the process begins again as the registers are filled with five more parameters.

TABLE II

| Waveforms and counter entries at FIG. 4 | |
|---|---|
| Identification function | Descriptive Information |
| ØA Clock | Starts from PC high |
| ØB Clock | Starts from PC high |
| C1 Counter 1 | Number of transmitted parameters in shift registers |
| C2 Counter 2 | Number of parameter at output of shift registers |
| C3 Counter 3 | Number of frames being interpolated over |
| C4 Counter 4 | Number of frame currently being tested |
| PC Parameter complete | Coefficients for frame have been calculated and are available |
| A1 Timing Signal | Causes interpolated value to be latched in operations box 66 and shifts out new coefficient value from shift registers. |
| A2 Timing Signal | Causes counter 92 to decrement to shorten interpolation interval |
| A3 Timing Signal | Causes TE to latch on clocks when valid differences are available from subtracter 70. |
| A4 Timing Signal | Causes latch 62 to hold interpolation step size for current interpolation range. |
| A5 Timing Signal | Latch quantized value for last frame in interpolation range. |
| A6 Timing Signal | Controls multiplexer 56 to feed first quantized value of last transmitted frame to subtracter 64 to form first interpolated value and then to feed latch 66 output back to subtracter 64 to generate successive interpolated values. |
| IC Interpolation Complete | send coefficient code and frame number of last frame |
| TE Threshold Exceeded | interpolation range too long, try again over range one frame shorter. |
| LAT | high transition indicates interpolation complete and hardware ready to accept new input data. |

TABLE II-continued

| Waveforms and counter entries at FIG. 4 | |
|---|---|
| Identification function | Descriptive Information |
| MI Multiplexer Input | high causes shift registers to circulate outputs back to inputs. |

One more pattern should be evident by inspection of the numbers on the counters 1 through 4 as shown in FIG. 6. If interpolation had not been possible over any interval, then counter 1 would have stayed at seven through the entire process of attempted interpolation. It would then have dropped to six for one frame and incremented to seven to start a new interpolation at the start of the next frame. Counter 2 would have counted from seven to zero eight consecutive times. Counter 3 would have continued the pattern evident there, counting from seven to zero. Counter 4 would have counted from seven to zero, six to zero, until finally it reached a count of one to zero indicating that interpolation was impossible and that the circuit should send the coefficient code for the next successive frame.

The result of the previous operations is to create a stream of digital data. Since the last value for one interpolation is the first value for the next interpolation, it need be sent only once, and the number of frames spanned can be determined by counting. If the LPC coefficient was changing so much at the time the interpolation process was started that interpolation is ineffective, then the transmission process may use more bits than would have been used without interpolation because of the header required. This is the exception, however. The normal redundancy in speech, both in sounds and in the silence between syllables and words, allows interpolation to be used often enough and over enough frames to reduce the average bit rate.

Figure 7:
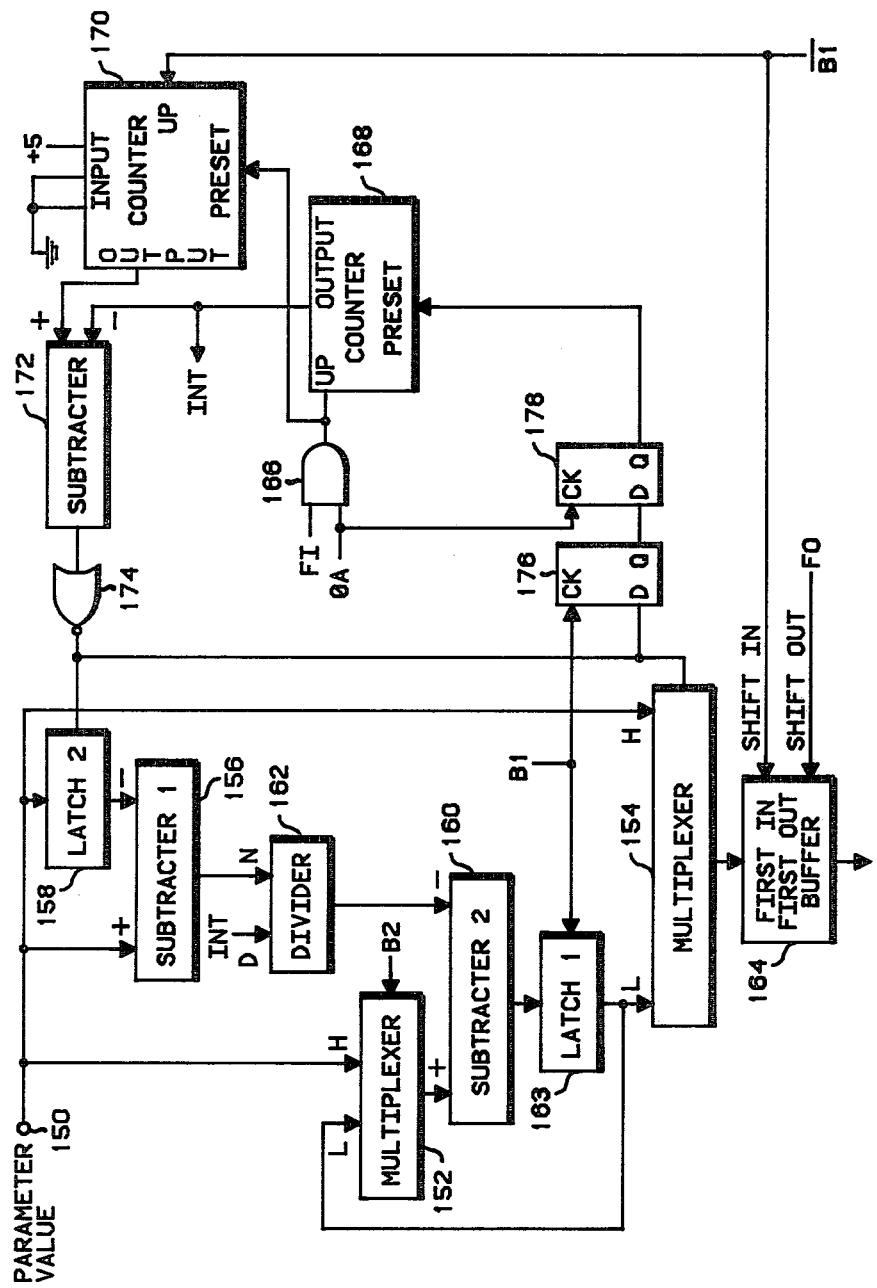
FIG. 7 is a block diagram of a portion of the variable-to-fixed-rate coding circuit of FIG. 1.

The transmitted data stream can be transformed back to a stream of frames of fixed length. To do this, it is necessary to compute the interpolated coefficient values for frames in which the coefficient was not transmitted. The LPC speech synthesizer can then read a new set of coefficients every frame time, just as is now the case with standard fixed-frame LPC. The interpolation process to generate the interpolated frame values for the coefficients and feed them to the LPC synthesizer is accomplished with the circuit of FIG. 7. The codes for the coefficients are received from a communications channel. The quantized coefficient values corresponding to these codes are presented on terminal 150 of FIG. 7. As was true with the interpolator, it will be necessary either to have a circuit such as that of FIG. 7 for each parameter or else to have the circuit and its elements multiplexed to operate on each LPC coefficient in succession. The circuit of FIG. 7 is adapted to receive at terminal 150 just one of the quantized LPC parameters. The parameter value at terminal 150 is taken to multiplexers 152 and 154, subtracter 156 and latch 158. The output of multiplexer 152 is taken to subtracter 160. The output of latch 158 is subtracted in subtracter 156 from the parameter value at terminal 150, and the difference is taken to divider 162. The output of divider 162 and that of multiplexer 152 are subtracted in subtracter 160, and the difference is taken to latch 163. The output of latch 163 is taken back as one input to multiplexer 152 and is also taken as a second input to multiplexer 154 where it is multiplexed with the parameter value from terminal 150. The output of multiplexer 154 is taken as an input to buffer 164, the output of which is the desired stream of bits representing LPC coefficients as constant frame rates. The interpolated coefficient values are generated and are then stored in buffer 164 as controlled by control signal $\overline{B1}$. The data are fed from buffer 164 at a fixed frame rate by clocking signal FO.

A clocking input $\phi A$ and the control signal FI are taken as inputs to AND gate 166, the output of which is taken to counter 168 as an upcount controller and to counter 170 as a preset signal. The outputs of counters 168 and 170 are subtracted in subtracter 172. The output of subtracter 172 is fed to NOR gate 174 which goes high when the two counters 168 and 170 have the same count. The output of NOR gate 174 is used as a control signal to latch 158 and multiplexer 154. The output of NOR gate 174 is also taken as an input to flip-flop 176. Signal B1 controls latch 163 and also clocks flip-flop 176 whose output is fed to the input of flip-flop 178. Clocking input $\phi A$ clocks flip-flop 178 whose output is fed to preset counter 168, normally to zero.

Figure 8:
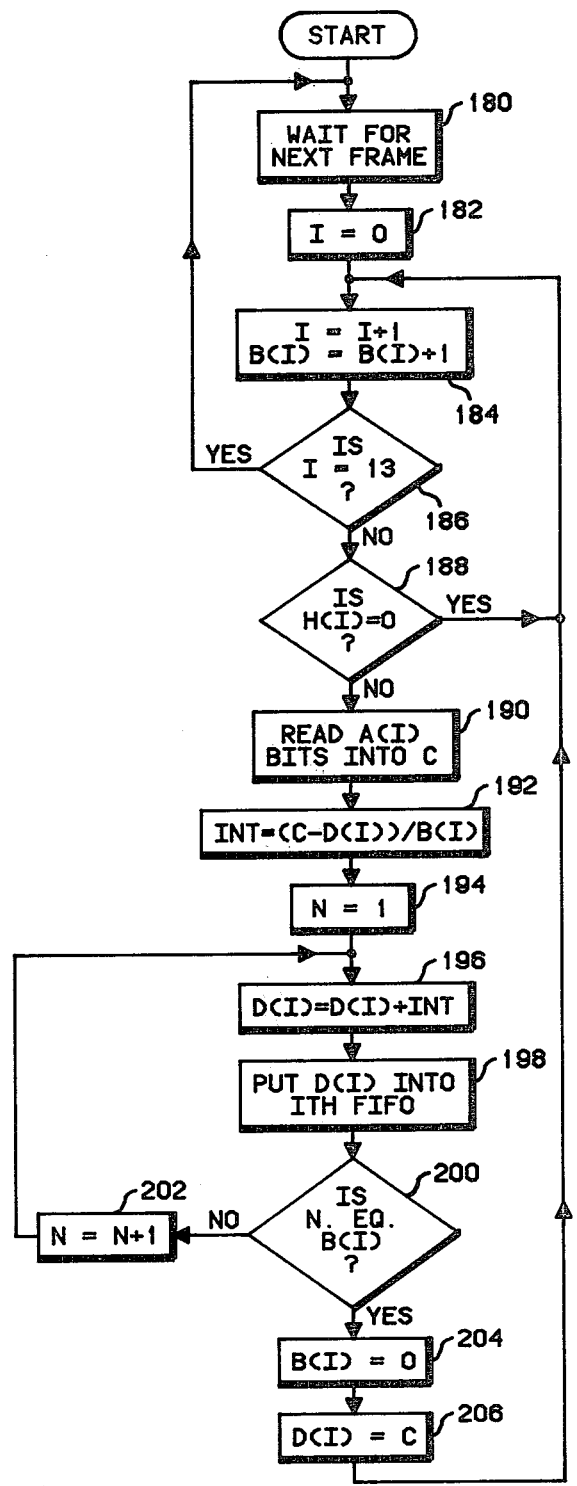
FIG. 8 is a flow chart of the operation of the circuit of FIG. 7.

The operation of the circuit of FIG. 7 will now be explained with the aid of the flowchart of FIG. 8 and the timing chart of FIG. 9. In the flowchart of FIG. 8, after a start, operations box 180 awaits for reception of the next frame of data. This frame of data contains a 12-bit header indicating which coefficients have been transmitted, and it also contains those coefficients. After the data for the next frame have been received, operations box 182 sets the initial value of I to zero. I is the number of the LPC coefficient under test. B(I) is a count of the number of frames since parameter I was last sent. Operations box 184 next increases the value of I by one and updates counter B. Decision box 186 next tests the value of I to see if it equals 13, meaning that a frame is complete. If the frame is complete, exit is on the "yes" line to operation box 180. If the frame is not complete, exit is on the "no" line to decision box 188, which tests to see if H(I)=0. H(I) is the value of the Ith bit in the header. This is shown as control signal HB in FIG. 9. When H(I)=0, the Ith parameter is not sent in that frame. When H(I)=1, it is sent. If H(I)=0, control cycles to operations box 184 and continues as described until I=13 or H(I) is unequal to 0. In the latter case, control passes to operations box 190 to read the next A(I) bits. A(I) is the number of bits allocated to the Ith coefficient, as listed in Table I. This inserts the parameter value for coefficient I into storage location C. This parameter value appears at terminal 150 of FIG. 7. Operations box 192 then calculates the quantity (C−D)(I))/B(I). This is the interpolation step size used to generate interpolated values. D(I) has previously been stored as the last received value of the Ith parameter. Next, operations box 194 sets an initial value of N equal to one. Operations box 196 then calculates a coefficient by adding the calculated interpolation step to the last coefficient received. The calculated coefficient is entered by operations box 198 into a sequential position in memory. Decision box 200 next tests to see if the process is complete by seeing if N is equal to the interpolated interval B(I). If it is not, exit from decision box 200 is on the "no" line, operations box 202 increases the value of N by 1, and the re-interpolation process is repeated until N equals the interpolation interval. Exit is then to decision box 204 which sets the number of frames B(I) to zero and decision box 206 which sets the value of the last frame as the value of the first frame for the next interpolation and returns control to operation box 184.

The flowchart of FIG. 8 is based upon a frame of data containing a header of twelve bits that contains a logical 1 for each LPC parameter that is sent in the frame and a 0 for each parameter that is not sent and to be created by interpolation. Thus, the shortest transmitted frame of data is one of 12 bits, all zeros, indicating that all parameters are to be recovered using information from a later frame for interpolation. Suppose now that this frame was the end of the interpolation interval for just one parameter, the gain, and that all the other parameters could be interpolated. The header bit for that frame will contain all zeros except for a 1 in the bit position identifying the gain, and it will also contain a five-bit code for the gain value that starts an interpolation with the last preceding value of gain. The number five is obtained from Table I. The longest frame if a header containing twelve ones, indicating that gain, pitch, and the twelve LARs are of the end of their interpolation range. After the twelve ones, the frame will contain the 58 bits of Table I to total 70 bits. As indicated earlier, most transmissions will be somewhere between the minimum of 12 bits and the maximum of 70. This maximum may be increased to 72, and the minimum to 14, if it is desired in addition to send the synchronization bits of the fixed-frame description of Table I.

Timing of the operation of the circuit of FIG. 7 and the flowchart of FIG. 8 is given by FIG. 9, which is a timing chart. FIG. 9 is in three parts, with interrupted timing separating the parts. In the first part, the signal HB is low or zero indicating that the coefficient was not sent this frame time. This calls for the frame counter to increase by one and for the interpolation process not to begin. In the second part of FIG. 9 following the first set of break lines, the header signal HB indicates that data have been sent and thus that the interpolation process should start. The third part of FIG. 9 indicates that the interpolation process is complete. Table III identifies the named waveforms of FIG. 9 and their descriptive features. Clock signals $\phi A$ and $\phi B$ are generated internally to supply clock pulses of opposite polarity for timing operations. HB is a waveform that is low for frames in which the header bit is zero for that coefficient and high when the header bit is a one. When the interpolation process has been effective over more than two frames, all that is sent is a header and the parameter value of the final frame. In similar fashion, the process of recovering data at constant frame width does not start until new information has been sent, as controlled by a change in state of waveform HB. Waveform FI goes high to indicate that a new frame has been received. In the waveform of FIG. 9, one frame is received where the header bit is a zero and no interpolation is to take place. The second pulse in waveform FI is seen to occur in a frame in which a header bit was a one. This starts the interpolation process that is described above.

TABLE III

| Waveforms of FIG. 9 | |
|---|---|
| Function | Description |
| $\phi A$ Clock | System clock for circuit timing |
| $\phi B$ Clock | Inverse of $\phi A$ |
| HB Header bit received | Indicates header bit is high and interpolation should begin |
| FI Frame Indicator | Pulse indicating reception of a frame |
| FO Frame Out | Signal from synthesizer to request new coefficient value at fixed frame intervals |
| B1 Timing Signal | Controls feeding of interpolated data into buffer and generates frames count of number of interpolated control |
| B2 Control Signal | Allows current coefficient value to subtracter 160 initially and then allows data from latch 163 to recirculate to subtracter 2 |

The preceding discussion has made it evident that when speech, or some other electrical signal exhibiting comparable redundancy, is encoded through linear predictive coding and subjected to the interpolation of the present invention, bandwidth may be conserved. In one type of application for which the present invention is appropriate, it may be desirable to send signals over a fixed bandwidth that is relatively narrow. It would be appropriate to try to adjust the average bit rate produced by the interpolation process to fit within the available bandwidth. This could lead to problems if a particular speaker or a particular message to be delivered required more bandwidth for a time than was available. Several techniques may be used in this case to reduce the average bit rate for a period of time. One technique is to reduce the number of LARs being transmitted. Another technique is to control the value of the threshold, increasing it to produce longer interpolation intervals and send parameter values less often. The threshold value may also be controlled as a function of gain, using a smaller threshold when the gain is high and a larger threshold when the gain is low. It is also possible to change the number of frames over which the circuit interpolates.

Certain applications in communications systems provide signal channels whose bandwidths vary as a function of time. The present invention is well adapted to make optimum use of such channels by adjusting the threshold to make the current bit rate fit the currently available channel bandwidth. Another measure of flexibility, useful either for fixed or variable channel bandwidths, is available by changing the maximum number of frames over which interpolation is carried out. This is particularly useful when the number of frames is adjusted as a function of the energy parameter, interpolating over a larger number of frames when the energy parameter represents a low value. The energy parameter is normally lowest during intervals of silence between syllables and words.

APPENDIX

```
C       SUBROUTINE FOR VARIABLE COEFFICIENT RATE
C       CODING OF LPC COEFFICIENTS
C
        SUBROUTINE VCR
        INTEGER COUNT
        DIMENSION X(256,11),E(256),QNT(11),THD(11),
       1IST(11),XY(256,2,11),ICF(11),ICS(11),Z(10),
       2ERR(10)
        COMMON XY,ICF,ICS,QNT,THD,X,E,ICOUNT,IST,ID,
       1ISTT,COUNT,IEND,KTEST,WTM,I1
        I1=0
        DO 110,I=1,11
        IF(ICF(I).NE.'C')GOTO 110
C
C       INTERPOLATION DISCRIMINATOR
C
    10  IEND=IST(I)+7
        IF(IEND.GT.ID)IEND=ID
    20  N=IEND-IST(I)
C
C       QUANTIZE LAST FRAME
C
        Z(N)=QNT(I)*INT(X(IEND,I)/QNT(I)+
       1SIGN(.5,X(IEND,I)))
C
C       DO INTERPOLATION AND TESTING
C
        IF(N.EQ.1)GOTO 90
        TT=(Z(N)-X(IST(I),I))/N
        IF(N.LE.KTEST.OR.(KTEST.EQ.1.AND.WTM.EQ.0.))
       1GOTO 30
        IF(WTM*ABS(X(IST(I)+KTEST,I)-X(IST(I),I)-
       1TT*KTEST).LE.THD(I))GOTO 30
        IEND=IEND-1
        GOTO 20
    30  CONTINUE
        DO 80,K=IST(I)+1,IEND-1
C
C       GAIN SUPPRESSION
C
        IF(E(K).LT.-15.)GOTO 50
        WT=1.
        GOTO 70
    50  IF(E(K).LT.-30.)GOTO 60
        WT=.5
        GOTO 70
    60  WT=.1
C
C       TEST IF ERROR EXCEEDS THRESHOLD
C
    70  KIST=K-IST(I)
        Z(KIST)=X(IST(I),I)+TT*KIST
        IF(WT*ABS(X(K,I)-Z(KIST)).LE.THD(I))GOTO 80
```

```
            KTEST=KIST
            WTM=WT
            IEND=IEND-1
            GOTO 20
      80 CONTINUE
C
C         INTERPOLATION AND TESTING COMPLETE
C
      90 KTEST=1
         WTM=0.
C
C         OUTPUT COEFFICIENTS
C
         DO 100,K=IST(I)+1,IEND
     100 X(K,I)=Z(K-IST(I))
         I1=I1+1
         XY(I1,1,I)=Z(N)
         XY(I1,2,I)=N
         IST(I)=IEND
         IF(IST(I).LE.128)GOTO 10
         IST(I)=IST(I)-128
     110 CONTINUE
         RETURN
         END
```

We claim:

1. A method of minimizing an amount of digital information sent to characterize a signal that has been divided into frames of equal times and for which parameters of linear predictive coding have been determined for each of a plurality of the frames, the method comprising:
   (a) storing parameter values of a predetermined number of frames;
   (b) determining interpolated values resulting from linear interpolation between parameter values of a first frame and a parameter value of a frame of the predetermined number;
   (c) comparing the interpolated values with the parameter values at frames between the first frame and the frame of the predetermined number to obtain compared values;
   (d) testing the compared values against a predetermined threshold; and
   (e) transmitting the parameter value of the frame of the predetermined number when no compared value exceeds the threshold.

2. The method of claim 1 comprising in addition the steps of:
   (a) reducing the predetermined number by one to obtain a reduced number when a compared value exceeds the predetermined threshold;
   (b) testing the reduced number for equality with the number of the first frame; and
   (c) transmitting the parameter value of the frame of the predetermined number when the reduced number equals the number of the first frame.

3. The method of claim 2 comprising in addition the steps of:
   (a) substituting the reduced number for the predetermined number when the reduced number is unequal to the number of the first frame; and
   (b) repeating the steps of determining, comparing, reducing, substituting, testing and transmitting.

4. The method of claim 3 comprising in addition to step of varying the predetermined threshold to achieve a desired bandwidth of a channel for transmitting the digital information.

5. The method of claim 3 comprising in addition the step of varying the predetermined number of frames to achieve a desired bandwidth of a channel for transmitting the digital information.

6. The method of claim 3 comprising in addition the step of varying the number of parameters of linear predictive coding to achieve a desired bandwidth of a channel for transmitting the digital information.

7. An apparatus for minimizing the amount of information sent to characterize a voice signal that has been divided into frames of equal times and for which parameters of linear predictive coding have been determined for each of a plurality of the frames, the apparatus comprising:
   (a) means for storing parameter values of a predetermined number of frames;
   (b) means for determining interpolated values resulting from linear interpolation between a parameter value of a first frame and a parameter value of a frame of the predetermined number;
   (c) means for comparing the interpolated values with the parameter values at frames between the first frame and the frame of the predetermined number to obtain compared values;
   (d) means for testing the compared values against a predetermined threshold;
   (e) means for transmitting the predetermined number and the parameter value of the frame of the predetermined number when no comparison exceeds the threshold;

(f) means for reducing the predetermined number by one to obtain a reduced number when a comparison exceeds the predetermined threshold;

(g) means for testing the reduced number for equality with the number of the first frame;

(h) means for substituting the reduced number for the predetermined number when the reduced number is unequal to the number of the first frame; and (i) means for transmitting a parameter value of the frame of the reduced number.

8. The apparatus of claim 7 wherein the means for transmitting comprise means for transmitting the parameter value of the frame of the predetermined number when no compared value exceeds the threshold.

9. The apparatus of claim 8 wherein the means for transmitting comprise in addition means for transmitting the parameter value of the frame of the predetermined number when the reduced number equals the number of the first frame.

10. The apparatus of claim 9 wherein the means for transmitting comprises in addition means for transmitting the parameter value of the frame of the reduced number when substitution of the reduced number for the predetermined number produces no compared value that exceeds the threshold.

11. The apparatus of claim 10 comprising in addition means for varying the predetermined threshold in response to a control signal to set a desired bandwidth.

12. The apparatus of claim 10 comprising in addition means for varying the predetermined number of frames in response to a control signal to set a desired bandwidth.

13. The apparatus of claim 10 comprising in addition means for varying a number of the parameters of linear predictive coding in response to a control signal to set a desired bandwidth.

14. An apparatus for minimizing the amount of information sent to characterize a signal that has been divided into frames of equal times and for which parameters of linear predictive coding have been determined for each of a plurality of the frames, the apparatus comprising:

(a) means for storing and cycling parameter values;

(b) means for storing and cycling quantized parameter values;

(c) means for storing, cycling and releasing coded quantized parameter values;

(d) means for determining an interpolation step size, the means connected to the means for storing and cycling quantized parameter values;

(e) means for determining an interpolated value of a parameter, the means connected to the means for storing and cycling quantized parameter values and to the means for determining an interpolation step size;

(f) subtracting means connected to the means for determining an interpolated value and to the means for storing and cycling parameter values, the subtracting means obtaining a difference between an interpolated value and a parameter value; and (g) means connected to the subtracting means, to the means for storing, cycling, and releasing coded quantized parameter values, and to a threshold for comparing a subtracted value with the threshold and controlling release of a coded quantized parameter value if the subtracted value exceeds the threshold.

15. The apparatus of claim 14 comprising in addition means for varying the predetermined threshold in response to a control signal to set a desired bandwidth.

16. The apparatus of claim 14 comprising in addition means for varying the predetermined number of frames in response to a control signal to set a desired bandwidth.

17. The apparatus of claim 14 comprising in addition means for varying a number of the parameters of linear predictive coding in response to a control signal to set a desired bandwidth.

* * * * *